Figure 4:
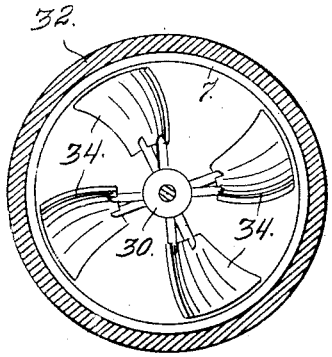

T. R. WIWI & J. W. FASSETT.
PORTABLE ELECTRIC FAN.
APPLICATION FILED JULY 28, 1913.
1,108,053. Patented Aug. 18, 1914.
2 SHEETS—SHEET 1.
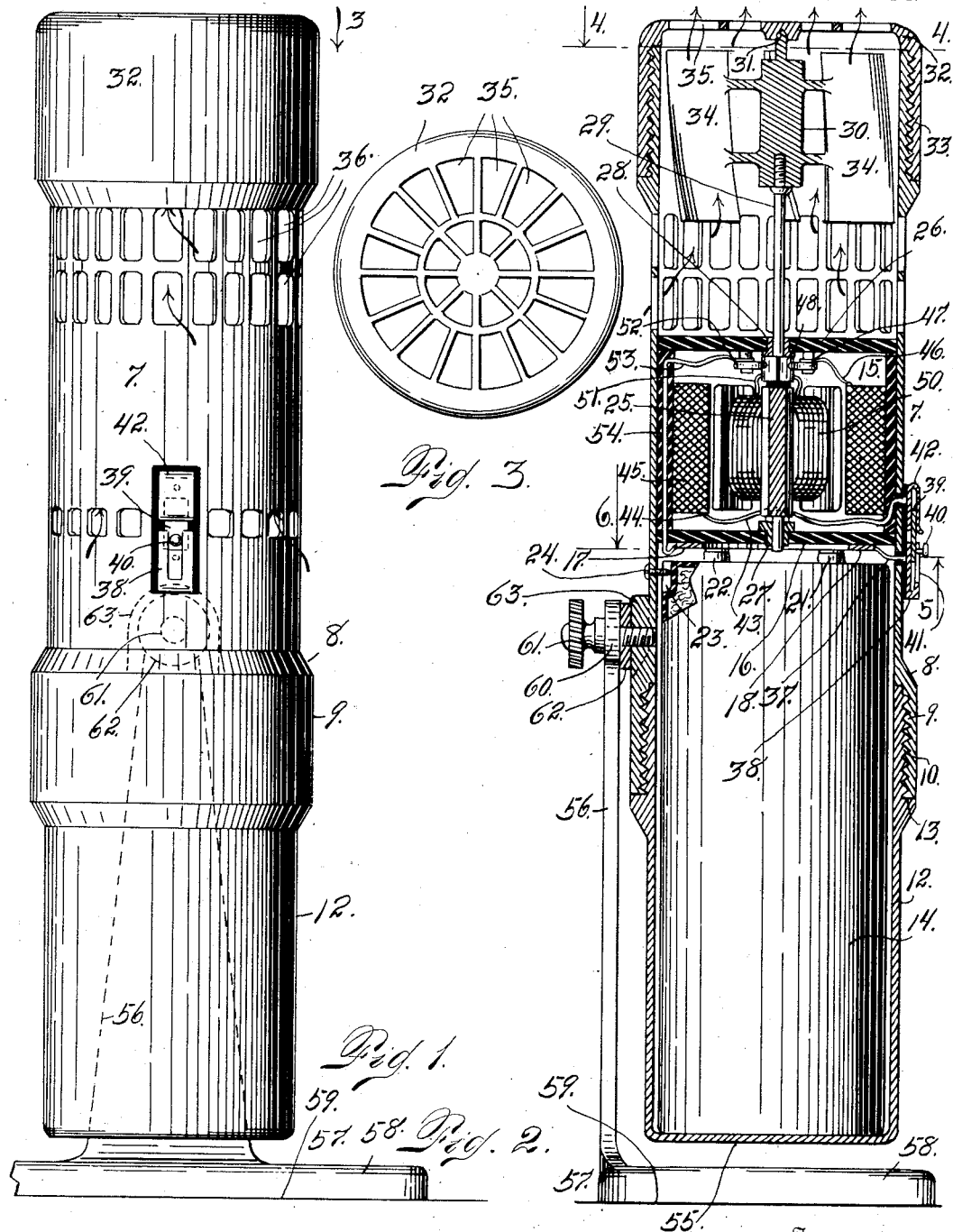

T. R. WIWI & J. W. FASSETT.
PORTABLE ELECTRIC FAN.
APPLICATION FILED JULY 28, 1913.

1,108,053.

Patented Aug. 18, 1914.

2 SHEETS—SHEET 2.

Witnesses
Otto E. Hoddick.
L. E. Petersen.

Inventors
Thomas R. Wiwi & James W. Fassett.
By A. J. O'Brine
Attorney

UNITED STATES PATENT OFFICE.

THOMAS R. WIWI AND JAMES W. FASSETT, OF DENVER, COLORADO.

PORTABLE ELECTRIC FAN.

1,108,053.

Specification of Letters Patent. Patented Aug. 18, 1914.

Application filed July 28, 1913. Serial No. 781,503.

*To all whom it may concern:*

Be it known that we, THOMAS R. WIWI and JAMES W. FASSETT, citizens of the United States, residing in the city and county of Denver and State of Colorado, have invented certain new and useful Improvements in Portable Electric Fans; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in portable electric fans. Our improved fan is of such shape and size that it may readily be carried in the pocket, and when in use may be employed with or without a stand or supporting bracket. When mounted on a bracket support, it may be tilted to direct the current of air issuing therefrom in any desired direction between the horizontal and vertical, and either above or below the axis of the pivot upon which it is adapted to swing.

Our improved device consists of a fan, a motor and a battery assembled in coöperative relation and mounted within a substantially cylindrical casing, the whole structure being of such mass that it may be readily carried in the pocket of the user. When carried in the pocket, it should be removed from its bracket support if it is desired to employ or utilize the bracket feature. The bracket may be so small that it may be easily carried in the pocket when the fan structure is detached therefrom, or even when the two parts are assembled if it should be desired to do so.

As illustrated in the drawing, the casing is composed of three parts, namely, the central or body part, the lower part which is readily removable from the body part, and the upper detachable member or the cap, the upper and lower members being preferably threaded upon the body or intermediate portion of the casing.

Having briefly outlined our improved construction, we will proceed to describe the same in detail, reference being made to the accompanying drawing, in which is illustrated an embodiment thereof.

Figure 5:
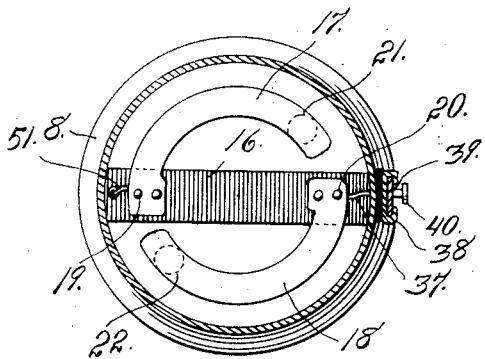
Figure 6:
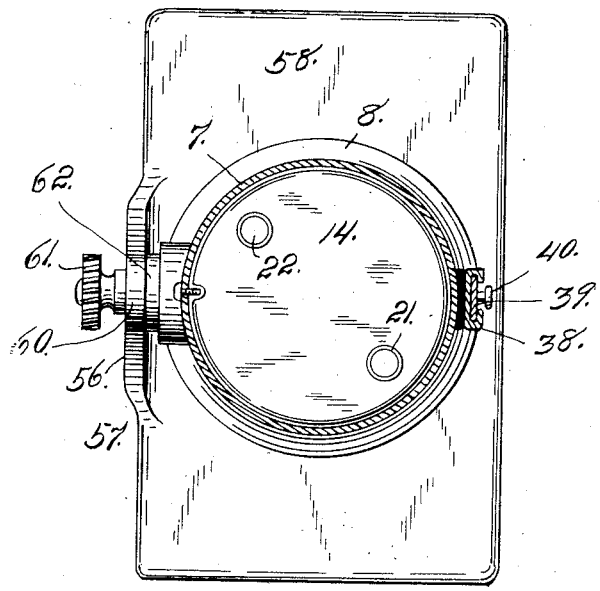

In this drawing: Figure 1 is a side elevation of our improved portable electric fan, the base of the supporting bracket being partly broken away. Fig. 2 is a section taken on the line 2—2, Figs. 1 and 5, the battery, however, being for the most part shown in elevation. Fig. 3 is a top plan or end view of the device looking in the direction of arrow 3, Fig. 1. Fig. 4 is a section taken on the line 4—4, Fig. 2 viewed in the direction of the arrow. Fig. 5 is a section taken on the line 5—6, Fig. 2 looking upwardly or in the direction of the arrow adjacent the numeral 5. Fig. 6 is a section taken on the same line looking in the opposite direction or the direction of the arrow adjacent the numeral 6 at the opposite end of the line.

The same reference characters indicate the same parts in all the views.

Let the numeral 7 designate the body of a preferably substantially cylindrical casing, whose lower portion is reinforced as shown at 8 and interiorly threaded as shown at 9 to receive the exteriorly threaded part 10 of a detachable casing member 12, the latter having a shoulder 13 against which the lower edge of the part 9 of the casing member 7 abuts, when the parts are assembled. This structure of the two parts of the casing makes the latter entirely smooth on the inside and adapted to receive a battery 14 for supplying current to a motor 15 which is arranged adjacent the battery, an insulating member 16 being interposed between the battery and the body of the motor. To the lower side of an insulating member 16 are secured two contacts 17 and 18, the extremities of these contacts being attached to the insulating member by suitable fastening devices 19 and 20. These contacts are insulated from each other and are so arranged that when the battery is in place its opposite poles 21 and 22 are in engagement with the contacts 17 and 18 respectively. The upper extremity of the battery is provided with a groove 23 adapted to receive the inner extremity of a screw pin 24 when the battery is in the proper position to maintain the necessary polarity or its proper position with reference to the contacts 17 and 18 as hereinafter more fully explained.

Mounted above the insulating member 16 and within the body 7 of the casing is the motor 15 whose armature shaft 25 is journaled at its lower extremity in the insulating member 16 and at its upper extremity in an insulating member 26, metal bushings 27 and 28 being employed. The armature shaft is provided with an extension 29 to which the fan member 30 is attached, the last named member being located within the upper part of the casing member 7, its upper or outer extremity being journaled in a recess 31 formed in the center of a cap 32 which is provided with a flange 33 which is interiorly threaded to coöperate with exterior threads formed on the casing part 7 when the members of the casing are assembled in coöperative relation.

The fan blades 34 are so shaped and arranged that a current of air will be directed outwardly through openings 35 formed on the top or outer extremity of the cap 32, the air being drawn in through the perforations 36 formed in the casing member 7 between the motor and the fan. Hence, when the device is regularly employed, it is desirable that the fan member should be so rotated as to direct the current of air outwardly at the upper extremity of the structure and for this reason it is necessary that the battery be so arranged with reference to the contacts 17 and 18 as to rotate the armature shaft in a uniform direction. For this reason, the guide pin 24 and the recess 23 formed in the motor are employed.

The electrical circuit may be described as follows: The current may be said to pass from the pole 22 of the battery to and through the contact 18, thence through a wire 37 to an exteriorly located contact 38 adapted to receive an adjustable slide 39 equipped with a manipulating button 40, the button being movable in a slot 41 formed in the contact 38. From the slide 39, when the circuit is closed, the current passes to and through a coöperating contact 42 which the slide 39 also engages. From this contact 42 the current passes through a conductor 43 to a terminal 44 of the field coil 45. The current passes thence through the coils of the field and thence from the opposite terminal 46 to a brush 47, which engages the commutator 48 of the motor. From the commutator, the current passes through a wire 49 to the coils 50 of the motor armature and thence from the last named coils from a conductor 51 to another section of the commutator, and thence through a brush 52, a conductor 53 and the contact 17 to the opposite pole 21 of the battery. It is not believed necessary to go more into detail in describing the motor circuit as there is nothing new per se about the motor or the winding of its field and armature coils.

As illustrated in the drawing, the commutator brushes are mounted on the insulating member 26 located at the upper end of the motor. In addition to the insulating parts 16 and 26 arranged at the upper and lower extremities of the motor, the latter is also surrounded by an insulating member 54 of cylindrical shape and interposed between the parts 16 and 26.

As illustrated in the drawing, the lower end or what may be for convenience termed the lower end 55, of the casing is flat and may form a support for the device if desired. The device, however, may be advantageously supported upon the upright arm 56 of a bracket 57 having a base 58. By employing this bracket the bottom of the device may be supported above the surface 59 and mounted to swing or rotate on the upper extremity 60 of the bracket arm by means of a set screw 61 which is threaded into the body of the casing as shown at 62 and journaled in the bracket arm, a reinforcing member 63 being interposed between the top of the bracket arm and the body of the casing. By virtue of this construction, the device may be secured in any desired position. That is to say, it may occupy a vertical position or any other position between the horizontal and vertical, and so that its upper extremity from which the current of air generated by the fan issues, may occupy a position either above or below the axis of the screw pin which connects the device with the bracket arm.

From the foregoing description, the use and operation of our improved portable pocket electric fan will be readily understood.

When the three members, the battery, the motor and the fan are properly assembled within the casing, and the detachable parts of the latter applied, the slide 39 should be so adjusted as to break the circuit, that is, it should be moved downwardly into the contact 38 until its opposite extremity is disconnected from the contact 42. Then whenever it is desired to operate the fan, it is only necessary to adjust the slide 39 by means of the button 40 to bring it into engagement with the contact 42 as well as the contact 38. When it is desired to change the position of the device upon the bracket 57, it is only necessary to loosen the set screw 61, move the device to the proper position, and then tighten the set screw.

Attention is called to the fact that the exterior contacts 38 and 42 are insulated from the casing which is also true of the conductors 37 and 43 which pass through perforations in the body of the casing. It should also be stated that the electric current employed for operating the motor is thoroughly insulated from the casing so that the latter may be handled without danger of shock from the current.

Attention is further called to apertures 3 formed in the body 7 of the casing between the battery and the motor. These openings provide for the cooling of the motor during operation of the latter.

Having thus described our invention, what we claim is:

1. The combination of a casing having a fan at one extremity thereof, a motor whose armature shaft is connected with the fan to rotate the latter, a battery arranged adjacent and connected in coöperative relation with the motor, the motor and fan being within the body member of the casing, a detachable casing member connected with the body member and inclosing a portion of the battery, and suitable means for guiding the battery when inserted in the casing, to cause the poles of the battery to engage contacts connected in operative relation with the motor to cause the current to pass therethrough in a uniform direction, and suitable means exposed on the casing for making and breaking the circuit at will, substantially as described.

2. A portable electric fan, comprising a casing of substantially uniform size throughout its length, a fan, a battery and a motor located within the casing and connected in coöperative relation, the fan being arranged in one extremity of the casing which is provided with openings for the exit of air, the casing between the motor and the fan being provided with air inlet apertures, while the casing between the battery and the motor is also equipped with perforations for the admission of air to cool the motor, the parts being connected to rotate the fan in a direction to expel the air.

3. A portable fan, comprising a casing of substantially uniform size, throughout its length, the bottom of the casing being closed and made flat to form a rest for the device, a fan element, a motor and a battery located within the casing and connected in operative relation therewith, the casing having apertures formed in its side walls and in one end for the inlet and exhaust of the air and the cooling of the motor.

4. A portable electric fan, comprising a casing, a fan member, a motor and a battery connected in coöperative relation and arranged within the casing, the latter being provided between the motor and fan with air inlet apertures for the purpose set forth.

5. A portable electric fan, comprising a casing, a fan member, a motor and a battery connected in coöperative relation and arranged within the casing, the latter being provided between the battery and motor with apertures for the admission of air to cool the motor.

6. A portable electric fan, comprising a casing, a fan member, a motor and a battery connected in coöperative relation and arranged within the casing, the latter being provided with apertures between the motor and fan and between the battery and motor for the purpose set forth.

7. A portable electric fan, comprising a casing, a fan member, a motor and a battery connected in coöperative relation and arranged within the casing, the latter being provided with apertures between the motor and fan and between the battery and motor and removable parts applied to the opposite extremities of said casing for the purpose set forth.

In testimony whereof we affix our signatures in presence of two witnesses.

THOMAS R. WIWI.
JAMES W. FASSETT.

Witnesses:
ANNA L. LEHMAN,
A. J. O'BRIEN.